United States Patent [19]

Guena et al.

[11] Patent Number: 5,164,719
[45] Date of Patent: Nov. 17, 1992

[54] RADIO SYSTEM FOR DATA TRANSMISSION WITH PASSIVE TERMINAL STATION

[75] Inventors: Jean Guena, Trebeurden; Jean-Claude Leóst, Perros - Guibec; Sylvain Meyer, Callac, all of France

[73] Assignee: French State Represented by Minister of Post, Telecommunications and Space (Centre National d'Etudes des Telecommunications), Moulineaux, France

[21] Appl. No.: 563,304

[22] Filed: Aug. 6, 1990

[30] Foreign Application Priority Data

Aug. 8, 1989 [FR] France ................. 89 10660

[51] Int. Cl.$^5$ ............................................. H04B 5/00
[52] U.S. Cl. ......................... 340/825.54; 342/44; 342/51
[58] Field of Search ............ 340/825.54, 572, 573; 235/439; 342/51, 361, 44

[56] References Cited

U.S. PATENT DOCUMENTS 4,857,893  8/1989  Carroll .................. 340/825.34
4,956,645  9/1990  Guena et al. ............ 342/361

FOREIGN PATENT DOCUMENTS

2527870   2/1983  France .
2631725  11/1989  France .

Primary Examiner—Donald J. Yusko
Assistant Examiner—Dervis Magistre
Attorney, Agent, or Firm—Lowe, Price, LeBlanc & Becker

[57] ABSTRACT

The radio system embodying the invention comprises a central station and a passive terminal station. First and second data signals are transmitted between data processing units respectively connected to the central and terminal stations. The terminal station comprises a same low-cost circuit associated with a square two-dimensional antenna for detecting the amplitude of a first incident microwave emitted by the central station thereby recovering the first data signal and deriving, in response to the first microwaves, a microwave modulated in phase by the second data signal by means of a retroreflection of a second incident microwave. This second incident microwave is emitted by the central station to the two-dimensional antenna of the terminal station. The terminal station is of very simple design, is compact and can therefore be included as well as the corresponding data processing unit in a contact-free chip card.

13 Claims, 4 Drawing Sheets

RADIO SYSTEM FOR DATA TRANSMISSION WITH PASSIVE TERMINAL STATION

BACKGROUND OF THE INVENTION

1. Field of the Invention

This invention relates to close-range radio communications in general. More specifically, this invention relates to a radio system for data transmission by microwaves between a central station and a passive end that does not have its own hyperfrequence source and that operates in a response mode.

Such a radio system can be used to exchange information over a short distance between a main point, called central station, and one or more passive ends, called terminal stations, which should be very simply designed to meet cost and space requirements. This type of radio system has numerous applications, e.g. in:

- remote-controlled data gathering systems such as a remote-controlled domestic counter reading system with a mobile radio accessor,
- access or checking management systems with remote inquiry for code numbers memorized in individual access or checking cards,
- road or rail signalling systems,
- automatic sorting systems, e.g. for parcel post,
- automatic invoicing systems for contact-free chip cards.

2. Description of the Prior Art

There are several known radio systems with a passive end in the prior art. French patent No. 2,527,870 describes a coded response card in which usually, an amplitude modulation is used to transmit data in the transmission direction going from the passive terminal station to the central station. An incident microwave transmitted by the central station is received by the passive terminal station in which data to be transmitted modulate in amplitude the incident microwave received or one of its harmonics before emitting it to the central station. The passive terminal station is supplied by the incident microwave. A rectifying and filtering circuit is usually provided to produce a d.c. supply voltage from the received incident microwave.

The modulated microwave retransmitted by the terminal station to the central station has a low output due to the low energy output rate at reception of the incident microwave and to the energy deducted to supply the passive end, and consequently the range of such a radio system is necessarily limited. Moreover, the amplitude modulation has low immunity from noise compared to a frequency or phase modulation, which does not favour the range of such a system.

A solution to improve the range of a radio system with a passive terminal station will be e.g. to replace the amplitude modulation of the retransmitted microwave by a two-phase-state modulation providing better immunity from noise.

Our U.S. patent application Ser. No. 351,234 filed May 15, 1989, now U.S. Pat. No. 4,956,645, claiming the French priority N°88-06794 filed May 20, 1988 and published Nov. 22, 1989 under N° 2,631,725, describes a radio system in which the microwave retransmitted by the passive terminal station is modulated in two phase states. This radio system enables communications of good quality. However, its cost is relatively high, mainly due to the necessity of a microwave switch in the passive terminal station. It is desirable to provide a radio system with a less expensive passive terminal station, operating in phase modulation for the retransmitted microwave, though paying the price of lesser performances relative to the radio system embodying the above-mentioned patent application.

OBJECT OF THE INVENTION

The main object of this invention is to remedy the preceding disadvantages, particularly to provide a radio system with intermediary performances in which a microwave switch in the passive terminal station is replaced by a very simple circuit which is used for modulating the phase of the retransmitted wave as well as for amplitude detecting the incident microwave.

SUMMARY OF THE INVENTION

Accordingly, there is provided a radio system embodying the invention for alternately emitting by microwaves first and second digital data signals between first and second data processing units connected to the radio system, the first data signal being transmitted by the first unit to the second unit during first data transmission periods, and the second data signal being transmitted from the second unit to the first unit during second data transmission periods.

The system comprises transmitting and receiving central and terminal stations.

The transmitting and receiving central station is connected to the first unit for emitting a first microwave modulated in amplitude by the first data signal during the first transmission periods and a second unmodulated microwave during the second transmission periods to the terminal station.

The transmitting and receiving terminal station is connected to the second unit for emitting a third two-phase-state microwave modulated by the second data signal during the second transmission periods.

The terminal station comprises one transmitting and receiving antenna having first and second ports, and microwave detecting and modulating means connected to the first antenna port via a transmission line for (a) detecting the amplitude of the first microwave emitted by the central station during the first transmission periods thereby recovering the first data signal and (b) deriving the third microwave from the second microwave received by the antenna during the second transmission periods and retroreflected on a end of the transmission line connected to the detecting and modulating means, the end of the transmission line being respectively in short-circuit and in open-circuit according to the logic levels of the second digital data signal.

Preferably, the detecting and modulating means included in the terminal station comprises a field effect transistor having first and second electrodes respectively connected to the second transmission line end and to a reference ground of the terminal section, and a third electrode to which is applied, during first data transmission periods, a given d.c. voltage controlling the operating of the transistor in quadratic condition and, during the second data transmission periods, the second data signal controlling the operating of the transistor in switching condition.

According to a preferred embodiment, the central station of the radio system embodying the invention comprises a two-dimensional emission antenna with two square two-dimensional elements and having first two ports receiving first and second microwave signals corresponding to the first and second microwaves for emitting the first microwave to the terminal station during the first data transmission periods and for emitting the second microwave and for supplying the second microwave signal during the second data transmission periods, a two-dimensional reception antenna with two square two-dimensional elements for receiving the third microwave emitted by the terminal station the during second data transmission periods thereby delivering two phase-shifted signals corresponding to the third microwave, and means connected to the square elements of the transmission and reception antennae and receiving the two phase-shifted microwave signals and the second microwave signal for phase demodulating the second data signal during the second data transmission periods.

BRIEF DESCRIPTION OF THE DRAWINGS

Further features and advantages of the invention will be apparent from the following particular description of several preferred embodiments of this invention as illustrated in the corresponding accompanying drawings in which.

DESCRIPTION OF THE PREFERRED EMBODIMENTS

Figure 1:
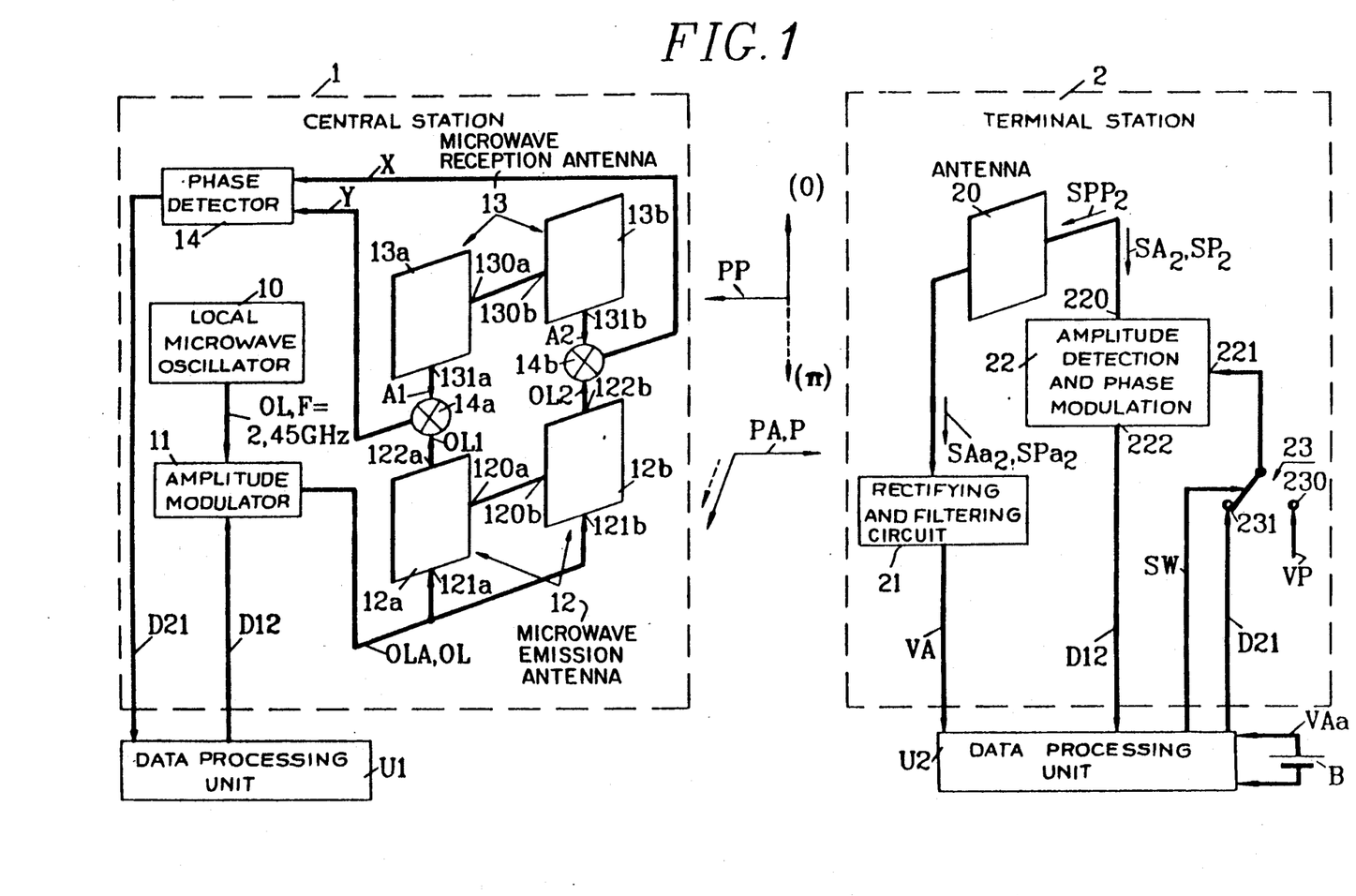
FIG. 1 is a block diagram of the radio system for data transmission with a passive end embodying the invention.

In reference to FIG. 1, the radio system for data transmission embodying the invention enables alternative transmission of series-type digital data signals D12 and D21 between two spaced data processing units U1 and U2. The units U1 and U2 are respectively connected to a central station 1 and to a terminal station 2 of the system. Each of the central and terminal stations 1 and 2 includes a radio equipment for data transmission associated with the respective unit U1, U2. The unit U1 and the central station 1 are e.g. included in a contact-free payment card operated phone kiosk. In this case, the unit U2 and the terminal station U2 are included in a contact-free payment card of the electronic chip card type.

The transmission of data signals D12 and D21 alternatively from the central station 1 to the terminal station 2 and inversely, respectively requires an amplitude modulation and a modulation in two phase states 0 and $\pi$ which uses the same carrier microwave P of frequency F transmitted by the central station 1. Data transmission periods from the unit U1 to the unit U2 and inversely are alternatively attributed to the data processing units U1 and U2. During the data transmission periods attributed to them, the units U1 and U2 respectively transmit the data signals D12 and D21. Reserved characters XON and XOFF carried by the data signals D12 and D21 are exchanged between the units U1 and U2 so as to indicate the beginning and end of a data transmission period to each other.

During the data transmission periods from unit U1 to unit U2, the central station 1 transmits a microwave PA of frequency F which is modulated in amplitude by the data signal D12. During the data transmission periods from unit U2 to unit U1, the central station 1 emits the non-modulated microwave P. The microwave P is detected by an antenna of the terminal station 2 and is modulated in two phase states 0 and $\pi$ by the data signal D21 to produce a microwave modulated in phase PP of frequency F retransmitted towards the central station 1 with the same polarization as the microwaves PA and P. The modulated microwaves PA and PP are respectively demodulated in the terminal station 2 and in the central station 1 so as to recover the data signals D12 and D21.

The central station 1 comprises a local microwave oscillator 10, an amplitude modulator 11, a microwave emission antenna 12, a microwave reception antenna 13, and synchronous phase demodulation means comprised of two mixers 14a and 14b and a phase detector 14.

The local oscillator 10 produces a microwave signal OL of frequency F e.g. equal to 2.45 GHz. The signal OL is applied at a first input of the amplitude modulator 11. A second input of the modulator 11 receives the data signal D12 desired by the unit U1.

During the data transmission periods from unit U1 to unit U2, the signal D12 is active and the modulator 11 supplies a modulated microwave signal OLA corresponding to the microwave signal OL whose amplitude has been modulated by the signal D12. The modulated microwave signal OLA is applied at the same-polarization ports of the antenna 12 which emits the corresponding microwave PA in response.

During the data transmission periods from unit U2 to unit U1, the signal D12 is inactive and the modulator 11 supplies the microwave signal OL. The signal OL is applied to the same ports of the antenna 12 which emits the corresponding microwave P in response.

The microwave emission antenna 12 is a plane antenna with two square-shaped printed patterns 12a and 12b. Like the antenna 12, the microwave reception antenna 13 is a plane antenna with two square-shaped printed patterns 13a and 13b. Also in reference to FIG. 2, the antennae 12 and 13 are supported by a two-sided printed circuit plate 123. On a front side, in addition to the antenna patterns 12a, 12b and 13a, 13b, the plate 123 also supports the mixers 14a and 14b. A conductive rear side of the plate 123 is connected to a reference ground and forms a reflective screen R1. Each square-shaped antenna pattern 12a, 12b and 13a, 13b has sides with a length equal to $\lambda/2$, where $\lambda$ is the wavelength corresponding to the frequency F of the microwave signal OL. In order to constitute the two-dimensional microwave antennae 12 and 13, the four patterns 12a, 12b and 13a, 13b are respectively placed in the four corners of a square of area $d \times d$ in such a way that the sides of the antenna patterns are parallel and perpendicular to the sides of the square $d \times d$, whereby d is a characteristic dimension and determined in a well known manner so as to obtain the desired radiation pattern.

Figure 2:
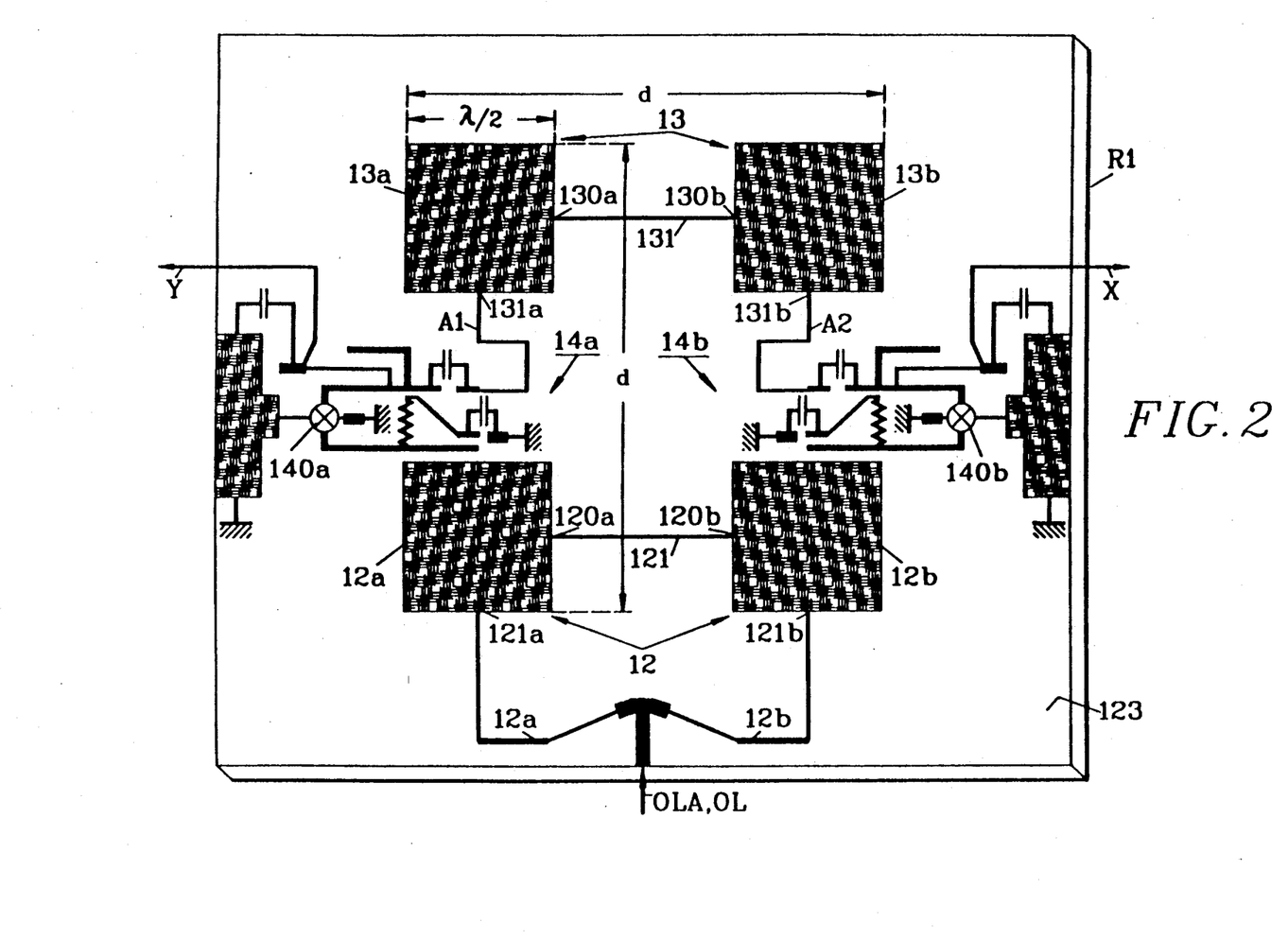
FIG. 2 is a principally top view of microstrip antenna and microwave mixers included in a central station of the radio system.

As shown in FIG. 2, two first same-polarization ports 120a and 120b of the patterns 12a and 12b are connected by a microstrip 121, the microwave signals OLA and OL are supplied to second ports 121a and 121b of the patterns 12a and 12b, cross-polarized in relation to the ports 120a and 120b, via microstrips 122a and 122b having symmetrical structures. The microwave signals applied to the ports 121a and 121b and corresponding to the signal OLA or OL are in phase and the antenna 12 emits the corresponding microwave PA or P towards the terminal station 2.

In reference to FIG. 1, the terminal station 2 comprises an antenna 20, a rectifying and filtering circuit 21, an amplitude detection and phase modulation circuit 22 and a low-frequency switch 23.

The antenna 20 is comprised of a single square printed pattern that is identical to the printed patterns 12a, 12b and 13a, 13b of the antennae 12 and 13 of the central station 1.

During the data transmission periods from unit U1 to unit U2, the antenna 20 receives the microwave PA whose amplitude is modulated by the signal D12 and issues corresponding microwave signals in response which are phase shifted by $\pi$ from each other $SA_2$ and $SAa_2$ respectively via two different ports. The signals $SA_2$ and $SAa_2$ are respectively applied to an input 220 of the circuit 22 and to an input of the circuit 21. During the data transmission periods from unit U2 to unit U1, the antenna 20 receives the microwave P and issues in response via the same ports corresponding microwave signals phase shifted by $\pi$ from each other $SP_2$ and $SPa_2$. The signals $SP_2$ and $SPa_2$ are respectively applied to the input 220 of the circuit 22 and to the input of the circuit 21.

The rectifying and filtering circuit 21 is a conventional circuit e.g. including a rectifier diode and a filtering capacitance. The circuit 21 produces a d.c. supply voltage VA by rectifying and filtering. The voltage VA is supplied to unit U2 to supply all or some of the circuits in unit U2. A miniature electric battery B is, if necessary, provided to supply unit U2 with an additional d.c. supply voltage VAa.

During the data transmission periods from unit U1 to unit U2, the switch 23 is controlled by a signal SW derived by the unit U2. Switch 23 is in a position to engage contact so 230, a d.c. voltage VP is applied to an input 221 of the amplitude detection and phase modulation circuit 22. The voltage VP applied to the input 221 of the circuit 22 causes circuit 22 to operate as an amplitude detection thereby supplying data signal D12 to unit U2 via an output 222.

During the data transmission periods from unit U2 to unit U1, the switch 23 engages contact 231, and the data signal D21 is applied from unit U2 to the input 221 of the amplitude detection and phase modulation circuit 22. The circuit 22 then operates as a phase modulator, and a microwave signal $SPP_2$ whose phase is modulated by the data signal D21 is transmitted towards the antenna 2. The microwave PP corresponding to the signal $SPP_2$ is emitted by the antenna 20 to the central station 1.

Figure 3:
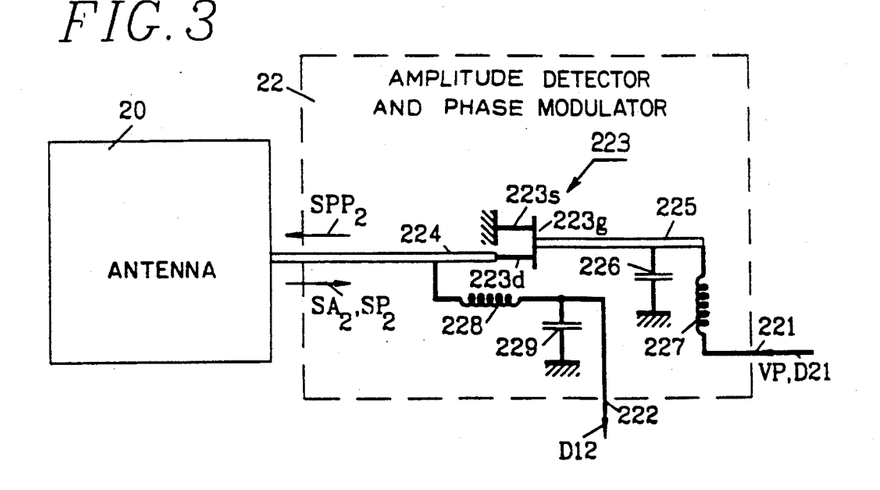
FIG. 3 is a skeleton diagram of an amplitude detection and phase modulation circuit included in the terminal station of the radio system.

In reference to FIG. 3, the amplitude detection and phase modulation circuit 22 is of extremely simple design and mainly comprises a single transistor 223 of the field effect type (FET).

A drain 223d of the transistor 223 is connected to the corresponding port of the antenna 20 via a first transmission line 224 corresponding to output 220 of circuit 22. A source 223s of the transistor 223 is connected directly to the ground. A gate 223g of the transistor 223 is connected to an end of a second transmission line 225. Another end of the line 225 is connected to ground via a capacitor 226 and to a first terminal of a coil 227. A second terminal of the coil 227 corresponds to the input 221 of the circuit 22 and receives the d.c. voltage VP and the data signal D21 respectively during transmission periods from unit U1 to unit U2 and from unit U2 to unit U1. An intermediary connection is provided in the transmission line 224 so as to connect a first terminal of a coil 228. A second terminal of the coil 228 corresponds to the output 222 of the circuit 22. A capacitor 229 links between the second terminal of the coil 228 to the ground.

The operating of amplitude detection and phase modulation circuit 22 is described hereinunder.

The transistor 223 has a conducting gate voltage range lying between VG=0 and VG=Vp, where VG is the gate voltage and Vp a negative pinch-off voltage. For a gate voltage VG=0, the transistor 223 is saturated and is equivalent between drain and source, 223d and 223s, to a resistor of very low resistance. When the gate voltage VG is lower than the pinch-off voltage Vp, the transistor 223 is turned off and is equivalent between drain and source to a resistor of very high resistance. The d.c. voltage VP lies in the gate voltage range for which the transistor 223 operates in quadratic condition and which has an intermediary amplitude lying between VG=0 and VG=Vp, i.e. $0 > VP > Vp$. The data signal D21 supplied by the processing unit U2 has voltage levels V1 and V2 such that V1=0 and V2<Vp. The levels V1 and V2 correspond to logic states "0" and "1" and respectively control the saturation and the OFF condition of the transistor 223.

During transmission periods from unit U1 to unit U2, the voltage VP is applied to the gate 223g of the transistor 223. The transistor 223 then operates in the quadratic condition and a signal $(SA_2)^2$ is produced from the drain 223d of the transistor 223. The signal $(SA_2)^2$ is representative of the square of the signal $SA_2$ supplied by the antenna 20. The coil 228 and the capacitor 229 constitute a low-pass filter which eliminates high-frequency components in the signal $(SA_2)^2$ and transmits a low-frequency component representative of the data signal D12. The length of the line 224 is determined so as to have optimal detection at the frequency F used.

During transmission periods from unit U2 to unit U1, the antenna 20 supplies the microwave signal $SP_2$ which is transmitted to the circuit 22, and the signal D21 is applied to the gate 223g of the transistor 223. When the data signal D21 is at the voltage level V1=0, the transistor 223 is saturated and the line 224 is terminated by a quasi-short circuit. At the level of this quasi-short circuit, the reflected electric field meets the limit requirements and has a phase opposite to that of the incident electric field. The microwave signal $SPP_2$ transmitted to the antenna 20 is produced from a phase-opposition reflection of the microwave signal $SP_2$. When the data signal D21 is at the voltage level V2<Vp, the transistor 223 is turned off and the line 224 is terminated by a quasi-open circuit. At the level of this quasi-open circuit, the reflected electric field is in phase with the incident electric field. The microwave signal $SPP_2$ transmitted to the antenna 20 is in phase with the microwave signal $SP_2$.

It therefore appears that the microwave signal $SP_2$ controlling the emission of the microwave PP is phase modulated with phases 0 and $\pi$ by the data signal D21 and is produced by retroreflection of the signal SP2. If necessary, a slight matching by stub can be carried out in the line 224 so as to obtain a phase shift exactly equal to $\pi$.

Figure 4:
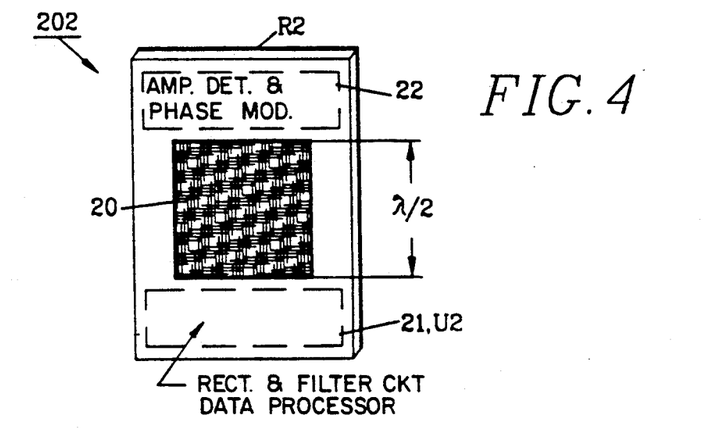
FIG. 4 is a principally top view of a contact-free chip card equipped with a terminal station of a radio system embodying the invention.

In reference to FIG. 4, the terminal station 2 and the data processing unit U2 are included in a contact-free chip card 202 represented approximately on a $\frac{3}{4}$ scale. A front side of the card 202 supports the antenna 20 and the various circuits of the station 2 and the unit U2. The circuits in the station 2 and unit U2 are in the form of microelectronic chips and discrete members having connection lugs soldered to microstrips of the card 202. The locations of the circuits 21 and 22 in the station 2 and of the unit U2 on the card are shown in broken lines. A reflective screen R2 located on a rear side of the card 202 is connected to a reference ground of the terminal station 2.

Again in reference to FIGS. 1 and 2, the microwave reception antenna 13 receives the modulated microwave PP. Two first same-polarization ports 130a and 130b of the patterns 13a and 13b are connected by a microstrip line 131. Microwave signals A1 and A2 corresponding to the microwave PP are respectively issued from second ports 131a and 131b of the patterns 13a and 13b.

The mixers 14a and 14b are of a known type and shall not be described in detail. Traditionally in the mixers, field effect transistors (FEC) 140a and 140b are used in microwave technology. First inputs of the mixers 14a and 14b respectively receive the microwave signals A1 and A2 supplied by the reception antenna 13. Second inputs of the mixers 14a and 14b are coupled with ports 122a and 122b of the patterns 12a and 12b of the emission antenna 12 and respectively receive local oscillator signals OL1 and OL2.

The signals A1, A2, OL1 and OL2 are expressed by the equalities:

$$A1 = U \cos(\omega t + \psi + \theta),$$

$$A2 = U \cos(\omega t + \psi + \theta + \pi/2),$$

$$OL1 = V \cos(\omega t),$$

and $$OL2 = V \cos(\omega t),$$

where U and V are respectively amplitudes of microwave signals A1, A2 and local oscillator signals OL1, OL2, where $\omega$ and $\psi$ respectively denote the angular frequency corresponding to the frequency F of the signal OL and a random phase shift introduced by the radio transmission between the stations 1 and 2, and where $\theta = 0$ and $\pi$ represent the phase state function of the data signal D21 in the microwave PP modulated in two phase states 0 and $\pi$.

The mixers 14a and 14b respectively provide two low-frequency demodulation signals X and Y derived from signal products A1.OL1 and A2.OL2 produced by the mixers 14a and 14b. The signals X and Y are expressed by the following equalities:

$$X = U.V \cos(\psi + \theta),$$

and $$Y = U.V \sin(\psi + \theta).$$

The equalities above show that the signals X and Y depend, according to trigonometrical functions, on the phase state $\theta = 0$ or $\pi$ of the microwave PP and on the random phase shift $\psi$.

The signals X and Y are applied to inputs of the phase detector 14.

Figure 5:
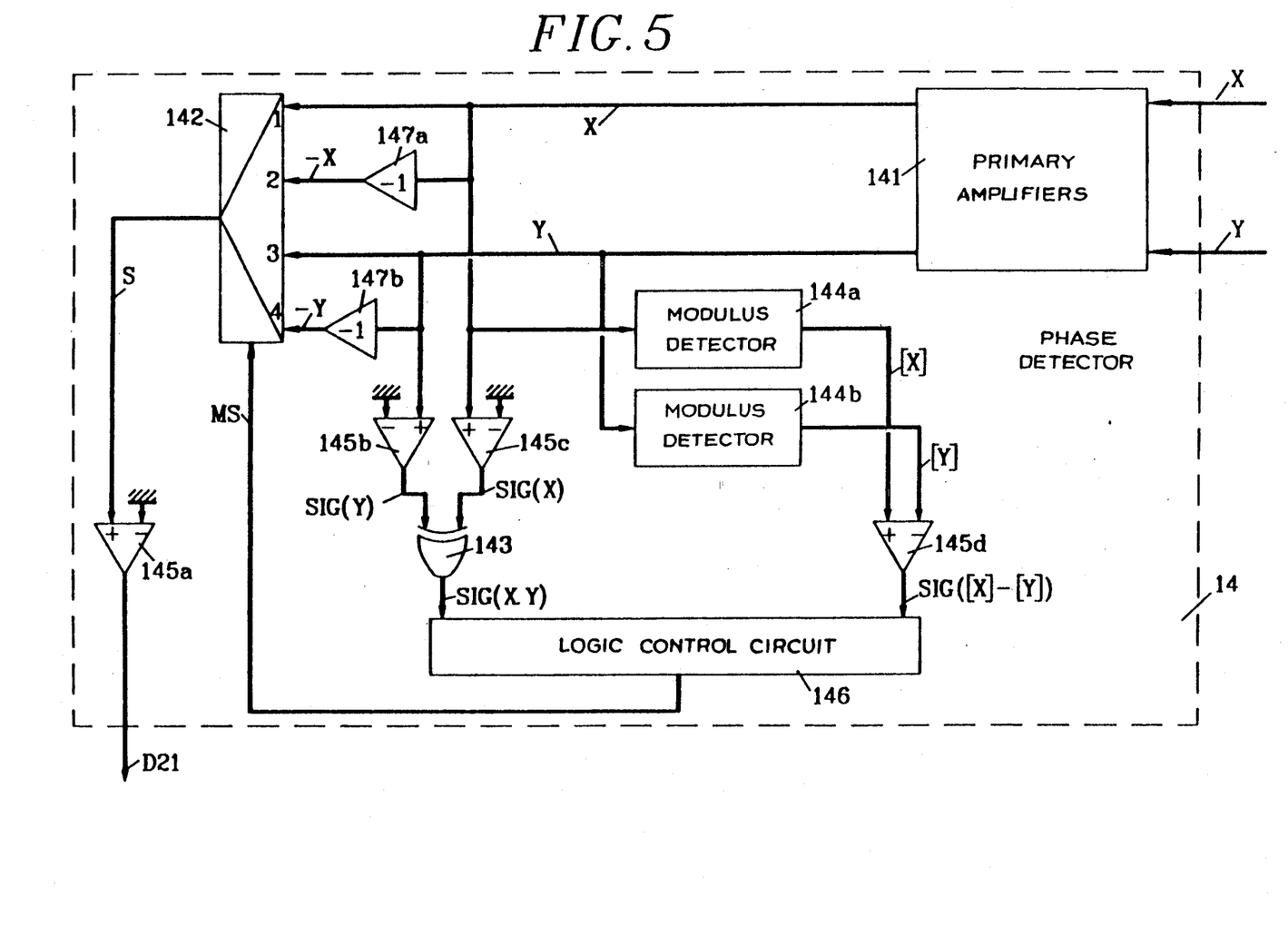
FIG. 5 is a block diagram of a phase detector included in the central station.

In reference to FIG. 5, the phase detector 14 essentially comprises primary amplifiers 141, a four-input analog multiplexer 142, a two-input Exclusive-OR gate 143, two modulus detectors 144a and 144b, four comparators 145a to 145d, and a logic control circuit 146.

The amplified signals X and Y are respectively supplied to first and third inputs of the multiplexer 142. Signals $-X$ and $-Y$ which are derived from the signals X and Y in inverter amplifiers 147a and 147b are respectively supplied to second and fourth inputs of the multiplexer 142. A signal S is selected from among the signals X, $-X$, Y and $-Y$ by a selection word MS which is supplied by the logic control circuit 146 and applied to selection inputs of the multiplexer 142. The signal S is supplied to a direct input + of the comparator 145a of which an inverse input is connected to the reference ground. The comparator 145a constitutes a sign detector which issues a logic state "0" when the sign of the signal S is positive and a logic state "1" in the opposite case. The comparator 145a restores the data signal D21 at output.

The purpose of the comparators 145b, 145c and of the Exclusive-OR gate 143 is to produce a signal SIG(X.Y) representative of the sign, i.e. polarity, of the products of the signals X.Y.

Direct inputs + of the comparators 145b and 145c respectively receive the signals Y and X. Inverse inputs $-$ of the comparators 145b and 145c are connected to the reference ground. The comparator 145b issues a signal SIG(Y) representative of the sign of the signal Y. The comparator 145c issues a signal SIG(X) which is representative of the sign of the signal X. The signal SIG(X) or SIG(Y) is in a logic state "0" when the sign of the corresponding signal X or Y is positive, and in a logic state "1" in the opposite case.

The signals SIG(X) and SIG(Y) are respectively applied to first and second inputs of the gate 143. The gate 143 provides a signal SIG(X.Y) representative of the sign of the product of the signals X.Y. The signal SIG(X.Y) is in a logic state "0" when the sign of the product X.Y is positive, and in a logic state "1" in the opposite case, i.e. when the sign of the product X.Y is negative. The signal SIG(X.Y) is applied to a first input of the logic control circuit 146.

The modulus detectors 144a and 144b receive the signals X and Y and issue the moduli $|X|$ and $|Y|$ of these signals respectively. The detectors 144a and 144b are e.g. made up of precision full-wave rectifying circuits. The moduli $|X|$ and $|Y|$ are respectively supplied to direct + and inverse $-$ inputs of the comparator 145d. The comparator 145d issues a signal SIG($|X|-|Y|$) representative of the sign of the modulus difference resulting from $|X|-|Y|$. The signal SIG($|X|-|Y|$) is applied to a second input of the logic control circuit 146.

The logic control circuit 146 carries out a dynamic selection of the signal S from among the signals X, $-X$, Y and $-Y$ so as to enable correct and optimal recovery of the data signal D21. This dynamic selection is carried out independently of the random phase shift variations caused by the radio transmission and likely to introduce decision errors on the data signal D21. From the signals SIG($|X|-|Y|$) and SIG(X.Y), the circuit 146 detects which of the signals X and Y has a superior modulus as well as the sign changes of the signals X and Y caused by the random phase shift variations. The modulus of the selected signal $|S|$ is taken equal to the greater of the moduli $|X|$ and $|Y|$. The sign attributed to the selected signal S depends on the detected sign changes of the signals X and Y from the signal SIG(X.Y).

Figure 6:
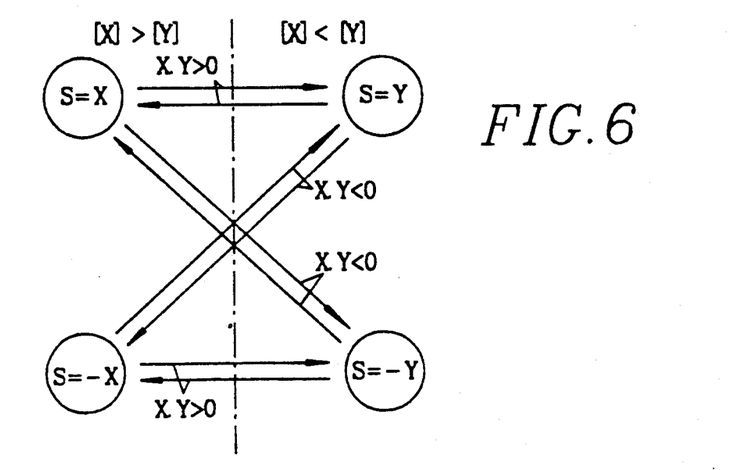
FIG. 6 is a logic diagram for the operation of a logic control circuit included in the phase detector of FIG. 5 so as to recover a data signal transmitted by the terminal station from a dynamic selection of a demodulation signal from among two available demodulation signals.

The logic diagram of FIG. 6 specifies the selected signal S=X, S=−X, S=Y or S=−Y according to the modulus conditions $|X|>|Y|$ and $|X|<|Y|$ and to the sign conditions X.Y>0 and X.Y<0 detected from the signals SIG($|X|-|Y|$) and SIG(X.Y) respectively.

In order to show how this diagram should be interpreted, an initial state during transmission is presupposed as an example whereby $|X|>|Y|$ is the detected modulus condition; the signal S=X or S=−X is then selected. In the event of the condition $|X|<|Y|$ then being selected, if the signal S=X is the signal selected in the initial state, then the new condition $|X|<|Y|$ entails the selection of the signal S=Y in the event of the sign condition X.Y>0 also being detected, and entails the selection of the signal S=−Y if the condition X.Y<0 is detected. If the signal S=−X is the signal selected in the initial state, then the new condition $|X|<|Y|$ entails the selection of the signal S=−Y in the event of the sign condition X.Y>0 also being detected, and entails the selection of the signal S=Y if the condition X.Y<0 is detected. Those skilled in the art will easily interpret this diagram for an initial state during transmission in which $|X|<|Y|$ is the modulus condition detected.

What is claimed is:

1. A radio system for alternately transmitting by microwaves first and second digital data signals between first and second data processing units connected to said radio system, said first data signal being transmitted by said first unit to said second unit during first data transmission periods and said second data signal being transmitted from said second unit to said first unit during second data transmission periods, said system comprising transmitting and receiving central and terminal stations, said transmitting and receiving central station being connected to said first unit for emitting to said terminal station a first microwave modulated in amplitude by said first data signal during said first transmission periods and a second unmodulated microwave during said second transmission periods, said transmitting and receiving terminal station being connected to said second unit for emitting a third two-phase-state microwave modulated by said second data signal during said second transmission period, said terminal station comprising one transmitting and receiving antenna having first and second ports, and microwave detecting and modulating means connected to said first antenna port via a transmission line for (a) detecting the amplitude of said first microwave emitted by said central station during said first transmission periods thereby recovering said first data signal and (b) deriving said third microwave from said second microwave received by said antenna during said second transmission periods and retroreflected from an end of said transmission line connected to said detecting and modulating means, said end of said transmission line being respectively in short-circuit and in open-circuit according to the logic level of said second digital data signal.

2. The radio system claimed in claim 1, wherein said detecting and modulating means comprises a field effect transistor having first and second electrodes respectively connected to said transmission line end and to a reference potential of said terminal station, and a third electrode to which is applied, during said first data transmission periods, a predetermined d.c. voltage controlling the operating of said transistor in quadratic condition and, during said second data transmission periods, said second data signal controlling the operating of said transistor in switching condition.

3. The radio system claimed in claim 1, wherein said terminal station comprises means connected to said second port of said antenna for producing a d.c. supply voltage by rectifying and filtering of said first and second received microwaves, said d.c. supply voltage being supplied to circuits in said terminal station and to said second data processing unit.

4. The radio system claimed in claim 1, wherein said central station comprises a two-dimensional emission antenna with two square two-dimensional elements and having first two ports receiving first and second microwave signals corresponding to said first and second microwaves for (a) emitting said first microwave to said terminal station during said first data transmission periods, and (b) emitting said second microwave and (c) supplying said second microwave signal during said second data transmission periods, a two-dimensional reception antenna with two square two-dimensional elements for receiving said third microwave emitted by said terminal station during second data transmission periods, thereby deriving two phase-shifted signals corresponding to said third microwave, and means connected to said square elements of said transmission and reception antennas and receiving said two phase-shifted microwave signals and said second microwave signal for phase demodulating said second data signal during said second data transmission periods.

5. The radio system claimed in claim 4, wherein said phase demodulating means comprises two microwave mixers receiving said phase-shifted microwave signals and said second microwave signal for respectively deriving two first low-frequency demodulated signals which depend, according to trigonometrical functions, on the phase state of said second data signal in said third microwave, and on a random phase shift introduced by said radio transmission, and means for recovering said second data signal from said two low-frequency demodulated signals.

6. The radio system as claimed in claim 5, wherein said recovering means comprises analog inverters for deriving two second low-frequency demodulated signals having a phase opposite to said first two low-frequency demodulated signals, and logic means for dynamically selecting one of said first and second low-frequency demodulated signals as a function of the moduli and polarities of said first two low-frequency demodulated signals so as to recover a replica of said second data signal.

7. The radio system claimed in claim 1, wherein said terminal station and said second data processing unit are integrated into a contact-free payment card including an electronic chip.

8. A radio system for alternately transmitting by microwaves first and second digital data signals between first and second data processing units connected to said radio system, said first data signal being transmitted by said first unit to said second unit during first data transmission periods and said second data signal being transmitted from said second unit to said first unit during second data transmission periods, said system comprising transmitting and receiving central and terminal stations, said transmitting and receiving central station being connected to said first unit for emitting to said terminal station a first microwave modulated in amplitude by said first data signal during said first transmission periods and a second unmodulated microwave during said second transmission periods, said transmitting and receiving terminal station being connected to said second unit for emitting a third two-phase-state microwave modulated by said second data signal during said second transmission period, said terminal station comprising one transmitting and receiving antenna having a port, and microwave detecting and modulating means connected to said port for (a) detecting the amplitude of said first microwave emitted by said central station during said first transmission periods thereby recovering said first data signal and (b) deriving said third microwave from said second microwave received by said antenna during said second transmission periods, said detecting and modulating means including a component that is selectively activated to be (a) an amplitude detector during said first transmission periods and (b) a two phase state modulator during said second transmission periods, said component being connected to said port via a transmission line during said first and second transmission periods, said component directing detected amplitude modulated replicas of the first data signal on the line to the second data processing unit during said first periods, said component responding to binary values of the second data signal to supply modulated waves having two phases representing the second data signal to the line during the second periods.

9. The radio system of claim 8 wherein said component during the second periods reflects the unmodulated waves on the line to said port and responds to the values of the second data signals to selectively change and not change the phase of the reflected waves.

10. The radio system of claim 9 wherein the component is a field effect transistor, having a source drain path and a gate, one electrode of the source drain path being connected to the line, a low pass filter responsive to the one electrode, the source drain path being controlled by voltage supplied to the gate electrode during the first periods so an output of the low pass filter is a squared replica of the amplitude modulated first data signal, the gate electrode being responsive to the second data signal during the second periods so that the source drain path is (a) saturated to substantially short circuit the line in response to the second data signal having a first value and (b) turned off to substantially open circuit the line in response to the second data signal having a second value.

11. A system for alternately transmitting by modulated waves first and second digital data signals between first and second data processing units connected to said system, said first data signal being transmitted by said first unit to said second unit during first data transmission periods and said second data signal being transmitted from said second unit to said first unit during second data transmission periods, said system comprising transmitting and receiving central and terminal stations, said transmitting and receiving central station being connected to said first unit for emitting to said terminal station a first wave modulated in amplitude by said first data signal during said first transmission periods and a second unmodulated wave during said second transmission periods, said transmitting and receiving terminal station being connected to said second unit for emitting a third two-phase-state wave modulated by said second data signal during said second transmission period, said terminal station comprising one transmitting and receiving structure having a port, and detecting and modulating means connected to said port for (a) detecting the amplitude of said first wave emitted by said central station during said first transmission periods thereby recovering said first data signal and (b) deriving said third wave from said second wave received by said structure during said second transmission periods, said detecting and modulating means including a component that is selectively activated to be (a) an amplitude detector during said first transmission periods and (b) a two phase state modulator during said second transmission periods, said component being connected to said port via a transmission line during said first and second transmission periods, said component directing detected amplitude modulated replicas of the first data signal on the line to the second data processing unit during said first periods, said component responding to binary values of the second data signal to supply modulated waves having two phases representing the second data signal to the line during the second periods.

12. The radio system of claim 11 wherein said component during the second periods reflects the unmodulated waves on the line to said port and responds to the values of the second data signals to selectively change and not change the phase of the reflected waves.

13. The radio system of claim 12 wherein the component is a field effect transistor, having a source drain path and a gate, one electrode of the source drain path being connected to the line, a low pass filter responsive to the one electrode, the source drain path being controlled by voltage supplied to the gate electrode during the first periods so an output of the low pass filter is a squared replica of the amplitude modulated first data signal, the gate electrode being responsive to the second data signal during the second periods so that the source drain path is (a) saturated to substantially short circuit the line in response to the second data signal having a first value and (b) turned off to substantially open circuit the line in response to the second data signal having a second value.

* * * * *